United States Patent Office 3,637,712
Patented Jan. 25, 1972

3,637,712
PIPERIDYLPROPANOL COMPOUNDS
Richard Anthony Partyka, Liverpool, and Robert Ted Standridge and Barbara Ann Hall, Syracuse, N.Y., assignors to Bristol-Myers Company, New York, N.Y.
No Drawing. Filed Jan. 26, 1970, Ser. No. 5,922
Int. Cl. C07d 29/16
U.S. Cl. 260—294.7 R    3 Claims

ABSTRACT OF THE DISCLOSURE

The specification discloses substituted piperidylpropanols and propanones of the structure

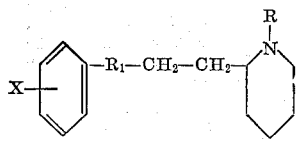

wherein X is halogen, hydrogen, or lower alkoxy, $R_1$ is hydroxymethylene or carbonyl, and R is lower alkyl and nontoxic acid addition salts thereof and a process for preparing the hydroxy compound by preparation and reduction of the carbonyl compounds. The hydroxy compounds are useful in the treatment of mammals and in the study of physiology and pharmacology.

BACKGROUND OF THE INVENTION

This invention is concerned with chemical compounds which have been found to have valuable pharmaceutical properties and with processes and intermediates useful in the preparation of the pharmaceutical compounds. More specifically, the compounds of this invention are aryl-substituted piperidylpropanols and the corresponding piperidylpropanones.

Certain aryl-substituted piperidylalkanols are known to possess specific physiological properties. These include the carbinols, propanols, and ethanols disclosed in U.S. Pats. 1,980,638, 2,874,161, 2,833,775, 2,833,776, and 3,306,895.

The compounds of this invention have been found to possess certain valuable physiological properties which make them useful as therapeutic agents for treatment of mammals. These compounds are also useful as adjuncts in the testing and evaluation of compounds of pharmacological interest.

The compounds of this invention are characterized by the structural formula

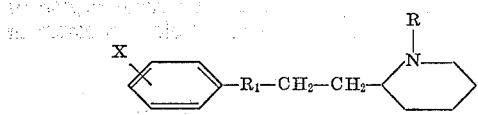

wherein $R_1$ is hydroxymethylene (CHOH) or carbonyl (C=O), X is a member of the group consisting of halogen, especially fluorine, and chlorine, hydrogen, and lower alkoxy, and R is lower alkyl, e.g., methyl and ethyl, and the pharmaceutically acceptable nontoxic acid addition salts of said compounds. X can be ortho, meta, or para to the propanol group.

The term "lower," as used herein with respect to aliphatic groups, is intended to refer to straight and branched chain groups of from 1 to 6 carbon atoms. Among the preferred alkyl groups, there may be mentioned methyl, ethyl, propyl, isopropyl, and butyl. Similarly, the corresponding alkoxy groups can be considered as of particular interest.

A particularly preferred group of compounds are those in which X is chlorine, fluorine, or methoxy, and R is methyl or ethyl.

Acid addition salts of this invention can be prepared by treating the piperidyl compounds with a suitable organic or inorganic acid such as hydrochloric, sulfuric, phosphoric, hydrobromic, hydroiodic, sulfamic, citric, lactic, maleic, malic, succinic, tartaric, acetic, benzoic, gluconic, ascorbic, and the like, or with an ester of such acids.

The compounds of this invention contain two asymmetric carbon atoms and accordingly may exist in two disastereomeric forms, each of which can be resolved into its optical isomers by conventional methods. Accordingly, the various isomeric forms of these compounds are within the scope of the invention.

The compounds of the invention can be conveniently prepared by syntheses which are well known. They can be prepared by reacting a pyridine carboxaldehyde with a suitable acetophenone using an acid or base catalyst, e.g., acetic acid, sodium hydroxide, or a mixture of piperidine and acetic acid. The resulting pyridal acetophenone can then be converted to the corresponding pyridinium iodide by reaction with an alkyl halide, preferably the iodide, in a suitable solvent such as acetonitrile. The resulting pyridinium iodide is then reduced to a piperidine followed by reduction of the carbonyl function to provide the desired alcohol.

Catalytic hydrogenation o fthe pyridinium iodide can be accomplished in a solvent mixture comprising a lower alkanol and having an acid pH. The pH of the solvent can be adjusted to control or optimize the reaction with additions of acids such as sulfuric acid, sulfonic acid, hydrochloric acid, acetic acid, or the like. In general, the ratio of acid to alkanol is not narrowly critical though it has been found to influence the rate of reaction. For example, a fifty/fifty mixture of ethanol and acetic acid has been found to allow the reaction to proceed at a slow rate, whereas a solvent mixture comprising from about 5 to about 15 percent acetic acid has been found to provide a suitably rapid reaction. A solvent containing about 10 percent acetic acid in methanol has been found to be quite satisfactory.

The process of the invention is illustrated by the following reaction scheme which shows the preparation of 1-(4-fluorophenyl) - 3 - (1 - methyl-2-piperidyl)-1-propanol hydrochloride. THF represents tetrahydrofuran; Skelly B is a petroleum solvent which is essentially n-hexane, having a boiling range of 60° C. to 68° C., and LAH is lithium aluminum hydride.

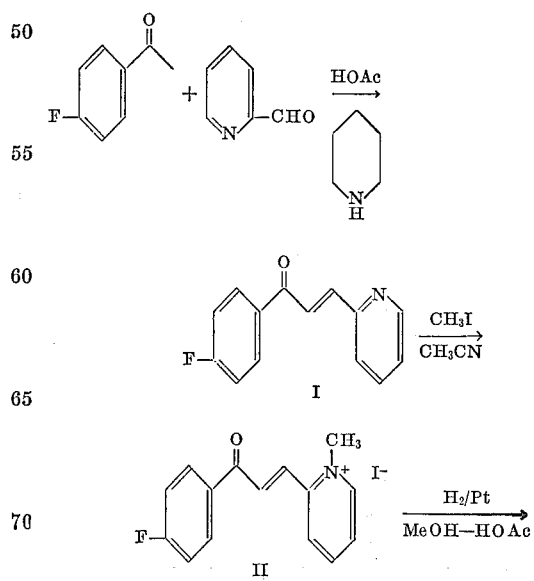

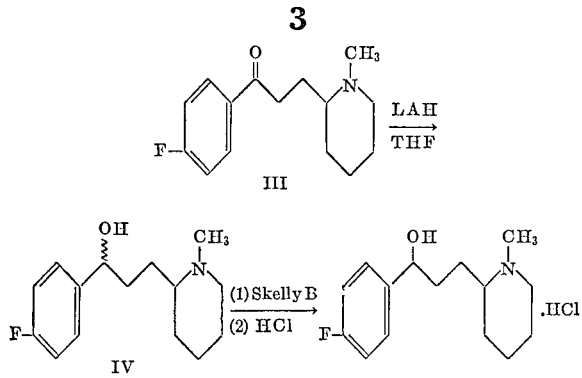

The pyridalacetophenone (I) is prepared by reacting a pyridine carboxaldehyde with an acetophenone at elevated temperature, such as by warming on a steam bath, in a reaction medium comprising piperidine and glacial acetic acid. The resulting reaction product can be recovered by extraction techniques involving the use of alumina and solvent extraction and used in the preparation of a benzoylvinyl-1-alkylpyridinium halide by treatment with a suitable alkyl halide in an inert solvent. This reaction is facilitated by the use of elevated temperatures, preferably by heating on a steam bath.

The reaction product is preferably dissolved in a solvent comprising a lower alkanol and an acid such as acetic, sulfuric, sulfonic, or hydrochloric and hydrogenated to produce the alkylpiperidyl propanone (III). The hydrogenation of the vinyl bond and the pyridine unsaturation can be carried out simultaneously through the use of a suitable catalyst, for example, platinum or Raney-nickel. Further reduction of the carbonyl function to provide the corresponding propanol can be achieved, e.g., by refluxing with lithium aluminum hydride. The final product can be recovered as the free base or as its acid addition salt by conventional techniques.

The compounds represented by the structures shown can be named as follows:

Formula I: β-(2-pyridyl)acrylophenones, 2-pyridalacetophenones, or 1-(2-pyridyl)-2-benzoylethylenes.
Formula II: 2-(2-benzoylvinyl)-1-alkyl-pyridinium iodides.
Formula III: 1-alkyl-2-(3-oxo-3-phenylpropyl)piperidines or 3-(1-alkyl-2-piperidyl)-1-phenyl-1-propanones.
Formula IV: 1-phenyl-3-(1-alkyl-2-piperidyl)-1-propanols or α-[2-(1-alkyl-2-piperidyl)ethyl]benzyl alcohols.

An important aspect of the invention is the provision of useful intermediates for use in the particular process herein described and in chemical syntheses in general. Of particular interest are the piperidylpropanones of the formula

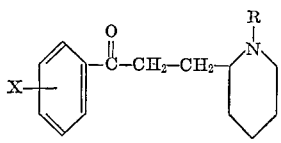

wherein R and X are as shown in structure A, above.

The compound 1-(4-fluorophenyl)-3-(1-methyl-2-piperidyl)-1-propanol has been found to possess significant activity as an antitremor agent capable of preventing tremors and is broadly active in mammals against hyperkinetic states in general. Surprisingly, however, this compound has not been found to have significant anticholinergic properties as shown by in vitro studies and the absence of inhibition of oxo-tremorine-induced tears and salivation.

The absence of anticholinergic properties was evaluated on isolated guinea pig ileum suspended in an organ bath in Ringer-Tynode solution at 37.5° C. and an atomosphere of 95% oxygen and 5% carbon dioxide. Isotonic contractions were recorded. No inhibition of acetylcholine-induced contractions was found at a concentration of 50 micrograms per milliliter of the test compound.

Comparative pharmacological data for the 4-fluoro-1-methyl compound, referred to above, and atropine sulfate is set forth in Table I, below, which gives the nature of the test, the test animal, and the route of administration of the test compound. Column 1 sets forth data for a material which is a mixture of geometric isomers, and column 2 gives data for the predominant isomer.

TABLE I

| | Test | Minimum effective dose in mg./kg. | | Atropine SO4 |
|---|---|---|---|---|
| | | 1 | 2 | |
| 1 | LD50, mouse, per os | 815 | 1,125 | >400 |
| 2 | Oxotremorine-induced tremor: | | | |
| | Mouse, per os | 60–90 | 50 | 2 |
| | Mouse, intraperitoneal | 50 | 20 | |
| | Rat, intraperitoneal | 50 | 20 | |
| 3 | Oxotremorine rage: cat intraperitoneal | >20 | | 2 |
| 4 | Harmaline tremor: | | | |
| | Mouse, per os | | 100 | |
| | Mouse, intraperitoneal | 50 | 50 | >50 |
| 5 | Nicotine convulsions: intraperitoneal | 50 | | >20 |
| 6 | Chlorpromazine catatonia reversal: | | | |
| | Rat, per os | | 200 | |
| | Rat, intraperitoneal | 50 | 50 | >25 |
| 7 | Haloperidol catatonia reversal: | | | |
| | Rat, per os | | 200 | |
| | Rat, intraperitoneal | 50 | 50 | 25 |
| 8 | Bulbocapnine catatonia: mouse, intraperitoneal | >100 | | >40 |

Although the above compounds did block catatonia induced by chlorpromazine and haloperidol at 50 mg./kg., i.p., it did not suppress conditioned avoidance in the rat as demonstrated by a pole climb test. These circumstances indicate that the compound is useful in treatment of the extrapyramidal reactions often associated with other known major tranquilizers. In this test procedure, the test animals are taught to avoid a painful stimulus by responding to a given stimulus, e.g., the animals are taught to avoid an electric shock by climbing a pole when a buzzer is sounded.

In the oxotremorine tests, tremors or rage, as the case may be, are induced by injection of oxotremorine. The test compounds are administered before challenge with oxotremorine. At a given period of time after challenge, the animals are observed for signs of the induced state. Similar standard procedures are employer to evaluate the effect of the test compound on various states induced in the test animals with other drugs.

The compound 1-(4-chlorophenyl)-3-(1-methyl-2-piperidyl)-1-propanol was found to have measurable antitremor activity and to exhibit some degree of hypotensive activity in that it reduced blood pressure in dogs.

EXAMPLE 1 p-Fluoro-2-pyridalacetophenone

Piperidine (6.0 g., 6.96 ml.) and 5.7 ml. (6.0 g.) of glacial acetic acid were mixed in a flask immersed in an ice bath. When the mixture had cooled to about room temperature, 34.6 g. (0.324 mole) of freshly distilled pyridine-2-carboxaldehyde and 44.7 g. (0.324 mole) of 4-fluoroacetophenone were added; the contents were mixed well and heated on the steam bath for two hours with occasional swirling.

The dark mixture was cooled to about room temperature and partitioned between dilute sodium carbonate solution and ether. The ether layer was separated, washed with four portions of water, dried (anhydrous MgSO4), and evaporated. The dark residue was extracted with about 1000 ml. of boiling Skellysolve B in three portions. The dark, resinous mass remaining was discarded. The combined extracts were evaporated. The residue was taken up in ethanol, stirred with decoloring carbon for one hour, and filtered. The filtrate was evaporated and the residue was recrystallized from Skellysolve B, M.P. 78.5° to 79.5° C. The yield of amber needles was 39.9 g. (54%).

*Analysis.*—Calc'd for $C_{14}H_{10}FNO$ (percent): C, 74.00; H, 4.44; N, 6.17. Found (percent): C, 74.34; H, 4.85; N, 6.27.

EXAMPLE 2

2-[2-(4-fluorobenzoyl)vinyl]-1-methylpyridinium iodide

In a sealed pressure flask a solution of 25 g. (0.11 mole) of p-fluoro-2-pyridalacetophenone and 15 ml. (34.2 g., 0.241 mole) of methyl iodide in 50 ml. of acetonitrile was heated on a steam bath for two hours. After cooling to about room temperature, the liquid was decanted. The red-orange crystals from four such runs were combined and recrystallized from 2000 ml. of methanol to give 140.4 g. (86%) of red-orange needles, M.P. 217° to 218° C. (dec.).

*Analysis.*—Calc'd for $C_{15}H_{13}FINO$ (percent): C, 48.80; H, 3.55; N, 3.79; I, 34.38. Found (percent): C, 48.75; H, 3.76; N, 3.78; I, 34.32.

EXAMPLE 3

1-methyl-2-[3-oxo-3-(4-fluorophenyl)propyl]piperidine and hydrochloride

A mixture of 900 ml. of methanol, 100 ml. of glacial acetic acid, 13.3 g. of platinum oxide, and 133.5 g. (0.36 mole) of 2 - [2 - (4 - fluorobenzoyl)vinyl] - 1 - methylpyridinium iodide was hydrogenated at an initial pressure of 47.5 p.s.i.g. After 70 minutes the reaction, as measured by pressure drop, was 90% complete. After 20 hours, the pressure drop was 94.5% of theory and the hydrogenation was stopped.

The mixture was filtered and the filtrated was evaporated in vacuo to give an amber oil. The oil was partitioned between ether and dilute sodium carbonate solution. The layers were separated and the aqueous was extracted with three portions of ether. The combined ether extracts were washed twice with water and once with saturated brine and dried over anhydrous sodium sulfate. Filtration and evaporation gave a pale amber oil which was distilled, B.P. 124° to 152° C./0.2 to 0.15 mm. The yield was 86.1 g. (96%).

*Analysis.*—Calc'd for $C_{14}H_{12}FNO$ (percent): C, 73.36; H, 5.24; N, 6.11. Found (percent): C, 73.21; H, 5.41; N, 6.23.

The hydrochloride, prepared in anhydrous ether, melted at 164° to 165.5° C. after recrystallization from ethyl acetate-acetone.

*Analysis.*—Calc'd for $C_{15}H_{20}FNO \cdot HCl$ (percent): C, 63.04; H, 7.41; N, 4.90; Cl, 12.41. Found (percent): C, 63.20; H, 7.46; N, 4.91; Cl, 12.34.

EXAMPLE 4

1-(4-fluorophenyl)-3-(1-methyl-2-piperidyl)-1-propanol and hydrochlorides

A solution of 86.1 g. (0.346 mole) of 1-methyl-2-[3-oxo-3-(4-fluorophenyl)propyl]piperidine in 400 ml. of anhydrous tetrahydrofuran was added dropwise to a stirred, refluxing suspension of 15.2 g. (0.38 mole) of lithium aluminum hydride in 300 ml. of anhydrous tetrahydrofuran.

All equipment was flame dried before use. The mixture was stirred and refluxed for 18 hours and was then decomposed by the successive addition of 15.2 ml. of water, 15.2 ml. of 15% sodium hydroxide solution, and 45.6 ml. of water. When the initially grey suspension had become white, it was filtered; the filter cake was washed well with tetrahydrofuran and the filtrate was evaporated to give 96.3 g. of colorless oil. Vapor phase chromatography showed a 40 to 60 mixture of the two diastereomers. Upon scratching in Skellysolve B, the oil solidified. An analytical sample was prepared by recrystallization from Skellysolve B, M.P. 80° to 99.5° C. Vapor phase chromatography showed the isomer ratio to be unchanged.

*Analysis.*—Calc'd for $C_{15}H_{22}FNO$ (percent): C, 71.71; H, 8.76; N, 5.58. Found (percent): C, 71.79; H, 8.93; N, 5.97.

The solid was stirred at room temperature for 20 minutes in 1000 ml. of Skellysolve B. The liquid was decanted and the procedure was repeated seven times. The remaining solid was filtered and recrystallized from ether to give 29.1 g. (33.6%) of crystalline base, M.P. 118° to 119.5° C. Vapor phase chromatography on this material showed a single peak corresponding to the isomer present in lesser concentration (isomer B). The hydrochloride was formed in anhydrous ether, M.P. 117° to 119° C. after recrystallization from acetone.

The combined Skellysolve B extracts were evaporated to yield a colorless solid. The hydrochloride was formed in anhydrous ether, M.P. 167° to 168.5° after recrystallization from acetone-methanol. The yield was 38.1 g. 38.3%). A sample of the salt was converted to the free base, M.P. 87.5° to 88° C. after recrystallization from Skellysolve B. Vapor phase chromatography on this material showed a single peak corresponding to the predominant isomer (isomer A).

*Analysis.*—Calc'd for $C_{15}H_{22}FNO \cdot HCl$ (percent): C, 62.61; H, 8.00; N, 4.87. Found (percent), isomer A: C, 62.60; H, 8.26; N, 4.82. Found (percent), isomer B: C, 62.75; H, 8.30; N, 4.82.

EXAMPLE 5

Substitution of equivalent amounts of 1-methyl-2-[3-oxo-3-(4-chlorophenyl)propyl]piperidine,
1-ethyl-2-[3-oxo-3-(4-fluorophenyl)propyl]piperidine,
1-ethyl-2-[3-oxo-3-(4-chlorophenyl)propyl]piperidine,
1-methyl-2-[3-oxo-3-(4-methoxyphenyl)propyl]piperidine, and
1-ethyl-2-[3-oxo-3-(4-methoxyphenyl)propyl]piperidine in the procedure of Example 4 provides 1-(4-chlorophenyl)-3-(1-methyl-2-piperidyl)-1-propanol,
1-(4-fluorophenyl)-3-(1-ethyl-2-piperidyl)-1-propanol,
1-(4-chlorophenyl)-3-(1-ethyl-2-piperidyl)-1-propanol,
1-(4-methoxyphenyl)-3-(1-methyl-2-piperidyl)-1-propanol, and
1-(4-methoxyphenyl)-3-(1-ethyl-2-piperidyl)-1-propanol, respectively.

We claim:
1. A compound of the structure

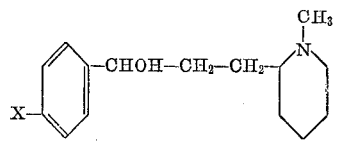

wherein X is selected from the group consisting of fluoro and chloro.

2. The compound 1-(4-fluorophenyl)-3-(1-methyl-2-piperidyl)-1-propanol, as defined in claim 1.

3. The compound 1-(4-chlorophenyl)-3-(1-methyl-2-piperidyl)-1-propanol, as defined in claim 1.

References Cited

UNITED STATES PATENTS 1,980,638  11/1934  Scheuing et al. __ 260—294.7 R
2,833,776  5/1958  Ruddy _____ 260—294.7 R

OTHER REFERENCES

JACS, vol. 73, 5913–5914 (1951), Truett et al.

NORMA S. MILESTONE, Primary Examiner

S. D. WINTERS, Assistant Examiner

U.S. Cl. X.R.

260—294.7 J, 294.7 M, 297 R, 293.8; 424—267